United States Patent [19]

Baumgartl

[11] Patent Number: 4,781,061

[45] Date of Patent: Nov. 1, 1988

[54] PROCESS FOR MONITORING THE GAS VOLUME IN AN HYDROPNEUMATIC ACCUMULATOR AND APPARATUS FOR CARRYING OUT THE PROCESS

[75] Inventor: Ulrich Baumgartl, Berlin, Fed. Rep. of Germany

[73] Assignee: Siemens Aktiengesellschaft, Berlin and Munich, Fed. Rep. of Germany

[21] Appl. No.: 26,823

[22] Filed: Mar. 17, 1987

[30] Foreign Application Priority Data

Mar. 20, 1986 [DE] Fed. Rep. of Germany ....... 3609701

[51] Int. Cl.$^4$ ...................... G01F 17/00; G01M 19/00
[52] U.S. Cl. ......................................... 73/149; 73/168
[58] Field of Search ...................... 73/149, 290 B, 168

[56] References Cited

U.S. PATENT DOCUMENTS

| 3,494,192 | 2/1970 | Zahid ................................. 73/290 B |
| 4,448,065 | 5/1984 | Meurer .............................. 73/149 X |
| 4,694,693 | 11/1987 | Gerlowski ............................. 73/168 |

FOREIGN PATENT DOCUMENTS 1093457 11/1960 Fed. Rep. of Germany .
1525857 12/1971 Fed. Rep. of Germany .
2240394 2/1974 Fed. Rep. of Germany .
3224136 12/1983 Fed. Rep. of Germany .

OTHER PUBLICATIONS

Siemens Zeitschrift, Band 43, No. 4, Apr. 1969, "Leistungsschalter H801-E fur 110 bis 145 kV mit elektrohydraulischem Antrieb"; pp. 285-287; in German.

*Primary Examiner*—Tom Noland
*Attorney, Agent, or Firm*—Kenyon & Kenyon

[57] ABSTRACT

In a hydropneumatic accumulator, the gas volume contained therein is monitored by measuring the volume increase in the hydraulic fluid, which takes place during a pressure increase at a given minimum pressure. Moreover, for monitoring purposes, the hydraulic pressure is measured and a signal transmitted at insufficient gas volume as a function of the volume increase and the pressure increase. In order to obtain reliable signals concerning the filling state of the accumulator at all ambient operating temperatures, the temperature of the environment and the gas volume is detected, a standard value for the volume increase proportional to the ratio of the gas temperature to the minimum pressure determined and the volume increase causing the pressure increase compared to this standard value.

10 Claims, 1 Drawing Sheet

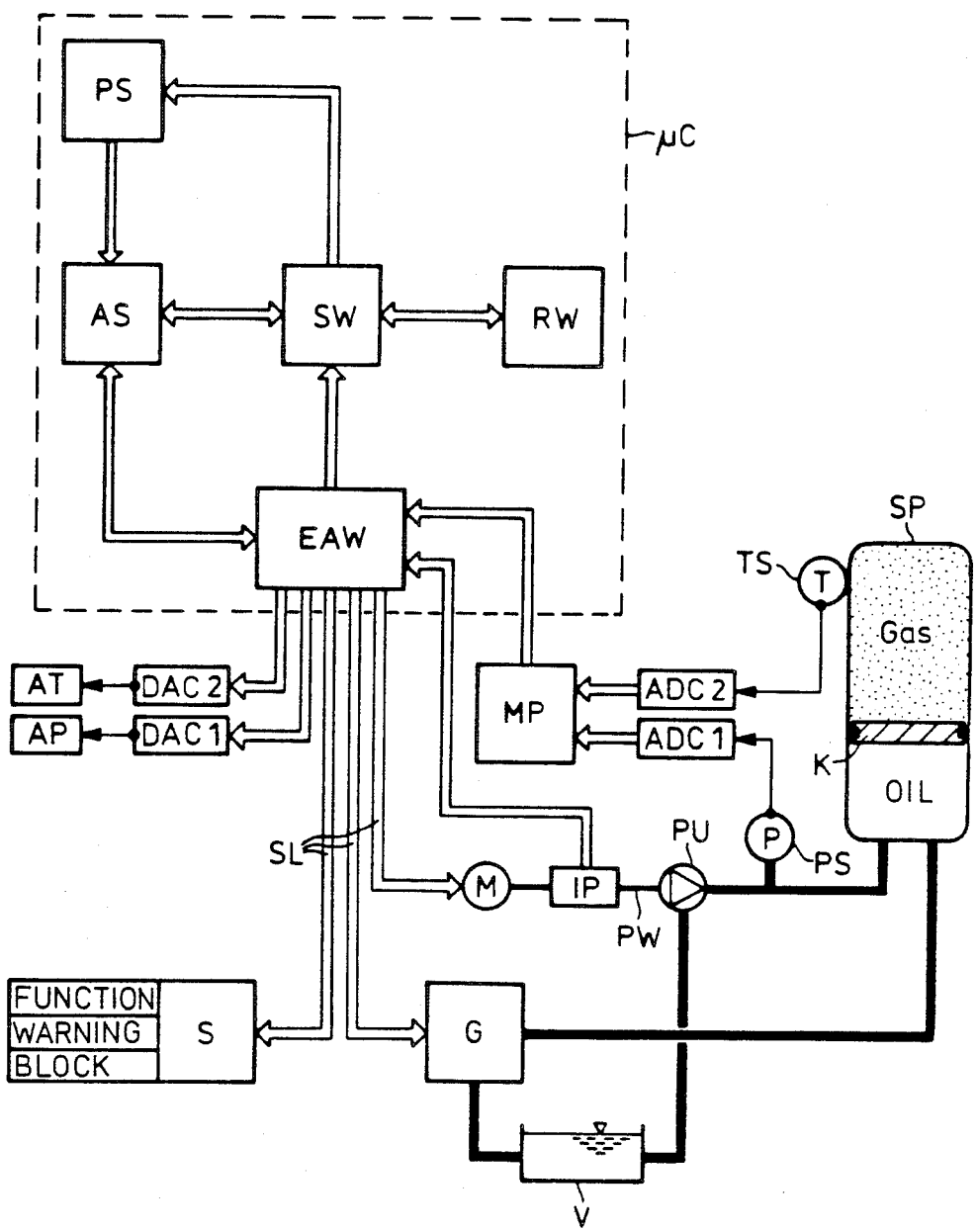

PROCESS FOR MONITORING THE GAS VOLUME IN AN HYDROPNEUMATIC ACCUMULATOR AND APPARATUS FOR CARRYING OUT THE PROCESS

BACKGROUND OF THE INVENTION

The present invention relates to a process for monitoring the gas volume in an hydropneumatic accumulator by measuring the volume increase of the hydraulic fluid following a pressure increase occuring at a given minimum pressure, by measuring the hydraulic pressure and by a signal output as a function of the volume and pressure increases at insufficient gas volumes.

In a process of this kind, known, for example, from DE-PS No. 15 25 857, the volume of gas in the accumulator is indirectly derived from the filling quantity and the pressure increase. In this process, either the largest permissible pressure difference associated with a given filling quantity or the smallest permissible filling quantity associated with a given pressure difference is determined.

In another process, known for example from DE-OS No. 22 40 394, a minimum gas volume is set by an internal stop in the accumulator for the purpose of monitoring the gas indirectly. If on refilling a free running piston drives against this stop, then the pump delivers, so to speak, against a solid wall and generates a steep pressure increase. In this process, conclusions concerning the volume of gas in the accumulator are drawn indirectly from the value for the pressure. In the known models, temperature compensation of the measuring values triggering the signal are not provided. Rather, in all applications of hydropneumatic accumulators, the minimum gas volume is calculated with respect to the lowest temperature of the environment respectively of the gas to be expected. This minimum gas volume limited by the piston position given on loading and unloading of the accumulator, is, however, different at different ambient temperatures, which therefore can possibly trigger temperature-related error signals during gas monitoring of hydropneumatic accumulators.

SUMMARY OF THE INVENTION

The present invention is based on the task of creating an indirect gas monitoring method, with which with any supply of gas volume in the accumulator, but especially in the gas volume range required for proper functioning, at all operational ambient temperatures, reliable signals concerning the state of filling of the accumulator can be obtained.

The above and other objects of the invention are achieved by a process for monitoring the gas volume in an hydropneumatic accumulator comprising the steps of measuring the volume increase of the hydraulic fluid occurring at a given minimum pressure, measuring the hydraulic pressure, and transmitting a signal depending on the volume increase and the pressure increase with insufficient gas volume, further comprising the steps of detecting the temperature of the gas volume, determining a standard value for the volume increase proportional to the ratio of the gas temperature to the minimum pressure, and comparing the volume increase causing the pressure increase with the standard value.

By applying the process according to the invention, by determining the temperature of the gas volume, a gas volume required for loading and unloading of the accumulator can be determined, and a signal obtained depending on this determination, which correspond to the state of filling of the accumulator clearly and unambiguously.

For carrying out this process according to the invention, a device has proven advantageous, in which a pulse generator is placed at the pump shaft of an hydraulic pump, which delivers the hydraulic fluid into the accumulator in a range between a minimum and a maximum pressure. In this process, the pulse generator transmits a constant number of pulses per shaft rotation; the number of pulse signals transmitted during each pumping process is a measure of the volume increase.

In a further development of the inventive concept, the device can, for carrying out the inventive process, feed the measuring signals for pressure and temperature and the output pulses to the input of a microcomputer, which computes the volume increase from the pulses, assigns a given standard value for the volume increase to the temperature measuring signal, compares the volume increase with its standard value and transmits a signal corresponding to the result of the comparison.

Where hydropneumatic accumulators are employed for driving electric high-tension power switches, it is advantageous if the microcomputer transmits a function signal when the volume increase exceeds a standard value, which informs the operator of the power switch of the functional state of the accumulator. It can, furthermore, be of advantage, if the microcomputer transmits a warning signal at a volume increase corresponding to the standard value, which lets the operator know unambiguously that maintenance or repair of the hydropneumatic accumulator must be expected in the immediate future. To avoid unacceptable operational procedures, for example, because of non-permissible discharge processes of the hydropneumatic accumulator due to too low an energy observation, in another advantageous design of the inventive concept, the microcomputer transmits at a volume increase below the standard value a blocking signal, which blocks the functions of the accumulator and the equipment operated by it.

It is an advantage with all embodiments if the microcomputer drives the pump which determines the volume increase of the hydraulic fluid.

BRIEF DESCRIPTION OF THE DRAWING

The process according to the invention for monitoring the gas volume in an hydropneumatic accumulator is explained and the mechanism of function of a device for carrying out this process is described with reference to the single drawing FIGURE.

DETAILED DESCRIPTION

The single drawing FIGURE shows an accumulator Sp with a free moving piston K. The accumulator Sp is loaded with hydraulic fluid from a reservoir container V by a pump Pu. The accumulator Sp supplies the driving energy for an apparatus G, for example, an electric gas pressure switch. The pump Pu is driven by a motor M. A pulse generator IP is located on the pump shaft PW. A pressure sensor PS is located in the connection between pump Pu and accumulator Sp, which detects the hydraulic pressure P. In the immediate vicinity of the gas chamber of the accumulator Sp, a temperature sensor TS is located, which detects the ambient temperature, the temperature T of the gas.

For clarification, the paths of the analog signal transmission are indicated by single lines and those of the digital signal transmission by double lines. Ducts for hydraulic fluid are drawn in heavy lines.

The pressure signal of the pressure sensor PS is transmitted to an analog/digital converter ADC 1 and the temperature signal of the temperature sensor TS to an analog/digital converter ADC 2 and digitized. The values of both converters are called up continuously over a multiplexer MP and supplied to an input/output device EAW. This input/output device EAW receives also the pulses I of the pulse generator IP.

The input/output device EAW feeds the digital data to a control unit SW. This control unit SW is connected to a working storage AS and an arithmetic unit RW. In addition, it controls a program storage PS, which represents a constant storage, in which program steps and constants are stored. This program storage PS transmits, depending on its control by the control unit SW, the individual program commands and constants to the working storage AS, which, in turn, scans the corresponding actual data from the input/output unit EAW. The entire data are used by the arithmetic unit RW to determine, according to the program commands, the results, which are supplied to the input/output device EAW over the working storage AS. Control unit SW, computing unit RW, program storage PS, working storage AS and input/output unit EAW are the essential components of a microcomputer uC.

During execution of the program, the input/output unit EAW controls the motor M of the pump Pu over the control connection SL depending on the requirements, the apparatus G and a signal device S. Depending on the control command, this signal device S can transmit a function signal, a warning signal or a blocking signal.

The values for pressure P and temperature T called up over the multiplexer MP are transmitted by the input/output unit EAW to a digital/analog converter DAC 1 and a digital/analog converter DAC 2. The pressure P can be read out on a pressure indicator AP and the temperature T from a temperature indicator AT.

In the program storage PS the following constants are stored:
maximum hydraulic pressure $P_{max}$
minimum hydraulic pressure $P_{min}$
delivery volume unit of the pump $V_E$
standard values table for the values $V_R$ (T)

The delivery volume unit $V_E$ indicates a constant volume delivered by the pump per pulse I.

The following program steps are controlled by the constants:

(I) Pump control
The motor is switched on, if the hydraulic pressure P is smaller or equal to the minimum hydraulic pressure $P_{min}$. The motor is switched off, if the hydraulic pressure P has reached maximum hydraulic pressure $P_{max}$.

(II) Summing of the pulses I during pump operation: pulse signal $I_{ges}$ (III) Computing the volume increase: $V_{zu} = I_{ges} \cdot V_E$ (IV) Searching the standard value as a function of the existing temperature T at the point at which $P_{max}$ has been reached: $V_R$ (T)

(V) Comparing the volume increase $V_{zu}$ with the standard value $V_R$ (T) and signal transmission:
A function signal is transmitted, if $V_{zu}$ is greater than $V_R$ (T) If both values are equal, a warning signal is transmitted. If $V_{zu}$ is smaller than $V_R$ (T) a blocking signal is transmitted. In this case, the motor M and the apparatus G are also blocked.

The standard value table for the volume increase $V_R$ (T) is supplied by an external computing program. This program can be designed in the following way:

On the assumption that the storage volume $V_{sp}$ is constant and is always composed of the oil volume $V_{oil}$ and the gas volume, in particular, the nitrogen volume $V_{N2}$, which defines the oil volume $V_{oil}$ as a function of temperature, the standard value for the volume increase of the hydraulic oil $V_R$ (T) can be calculated from the difference of the nitrogen volumes at the pressures $P_{min}$ and $P_{max}$.

The following relationship applies:

$$V_{sp} = const = V_{oil} + V_{N2}$$

From this can be calculated:

$$V_R (T) = V_{oil} (P_{max}) - V_{oil} (P_{min}) \quad (1)$$
$$= V_{N2} (P_{min}) - V_{N2} (P_{max})$$

Further calculations are based on the following: On first filling of the accumulator, nitrogen occupies at nominal conditions for pressure and temperature, the storage nominal volume $V_{sp}$ and has a specific volume $W_{sp}$. This specific volume $W_{sp}$ is constant over the entire temperature range. If a nitrogen volume $V_{N2}$ ($P_{min}$) or $V_{N2}$ ($P_{max}$) is present in the accumulator, then the corresponding specific volume is W ($P_{min}$) or W ($P_{max}$), respectively. Volume and specific volume change proportionally to each other. Therefore:

$$\frac{W_{sp}}{V_{sp}} = \frac{W(P_{min})}{V_{N2}(P_{min})} = \frac{W(P_{max})}{V_{N2}(P_{max})}$$

For the nitrogen volume the following value results:

$$V_{N2}(P_{min}) = \frac{V_{sp}}{W_{sp}} \cdot W(P_{min}) \quad (2a)$$

and $$V_{N2}(P_{max}) = \frac{V_{sp}}{W_{sp}} \cdot W(P_{max}) \quad (2b)$$

In which quotient $V_{sp}/W_{sp} = constant = K$. (2c) The specific volume W can be calculated with an empirical formula, known in its general form, for example, from the book of F. Din "Thermodynamic Functions of Gases", Volume 3, London, 1 Butterworths 1961.

$$W = a \cdot P^b + c \quad (3)$$

where a, b, and c are temperature-related constants and can be found in the same book.

If one puts equations (2a), (2b), and (2c) into equation (1), then:

$$V_R(T) = K \cdot (W(P_{min}) - W(P_{max}))$$

If one also uses equation (3), it follows $$V_R(T) = K \cdot a (P^b_{min} - P^b_{max}) \quad (4)$$

with a, b = f (T)

It would be fairly accurate to assume that both pressures $P_{min}$ and $P_{max}$ occur at the same temperature T. The temperature-related constant c, thus, is eliminated. It is advantageous to store the standard values $V_R(T)$ calculated for the different temperatures with formula (4) in the form of tables, for example, in 5 degree C. temperature intervals in the program storage PS.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and 1 drawing are, accordingly, to be regarded in an illustrative rather than in a restrictive sense.

What is claimed is:

1. A process for monitoring the gas volume in an hydropneumatic accumulator comprising the steps of measuring the volume increase of the hydraulic fluid occurring at a given minimum hydraulic pressure, measuring the hydraulic pressure, and transmitting a signal depending upon the volume increase and the hydraulic pressure increase when there is insufficient gas volume in the accumulator, further comprising the steps of detecting the temperature of the gas volume, determining a standard value for the volume increase proportional to the ratio of the gas temperature to the minimum hydraulic pressure, and comparing the volume increase causing the hydraulic pressure increase with this standard value.

2. The process for monitoring the gas volume in an hydropneumatic accumulator recited in claim 1, wherein a pulse generator is coupled to a pump shaft of a hydraulic pump supplying hydraulic fluid to the accumulator, said pulse signal being a measure of the volume increase, said process further comprising the step of supplying hydraulic fluid with said pump to the accumulator in the range between the minimum hydraulic pressure and a maximum hydraulic pressure.

3. Apparatus for monitoring the gas volume in an hydropneumatic accumulator comprising means for measuring the volume increase of the hydraulic fluid occurring at a given minimum hydraulic pressure, means for measuring the hydraulic pressure and means for transmitting a signal depending on the volume increase and the hydraulic pressure increase when there is insufficient gas volume in the accumulator, further comprising means for detecting the temperature of the gas volume, means for determining a standard value for the volume increase proportional to the ratio of the gas temperature to the minimum hydraulic pressure and means for comparing the volume increase causing the hydraulic pressure increase with this standard value, and further comprising pulse generator means coupled to a pump shaft of an hydraulic pump, said hydraulic pump supplying hydraulic fluid to the accumulator in the range between the minimum hydraulic pressure and a maximum hydraulic pressure.

4. The apparatus recited in claim 3, wherein the pulse generator means comprises means for generating a pulse signal having a constant number of pulses per shaft rotation, the pulse signal being a measure of the volume increase.

5. The apparatus recited in claim 4, wherein a measuring signal for pressure and temperature and the pulse signal are supplied to the input of a microcomputer.

6. The apparatus recited in claim 5, wherein the microcomputer comprises means for computing from the pulse signal the volume increase, means for assigning to the temperature measuring signals a given standard value for the volume increase, means for comparing the volume increase with the standard value and means for transmitting a signal corresponding to the comparison result.

7. The apparatus recited in claim 6 wherein the microcomputer comprises means for transmitting a function signal when a volume increase exceeds the standard value.

8. The apparatus recited in claim 6, wherein the microcomputer comprises means for transmitting a warning signal when a volume increase corresponding to the standard value occurs.

9. The apparatus recited in claim 6, wherein the microcomputer comprises means for transmitting a blocking signal when a volume increase occurs below the standard value, which blocks the functions of the accumulator and further apparatus driven by the accumulator.

10. The apparatus recited in claim 4, wherein the microcomputer comprises means for driving the hydraulic pump.

* * * * *